(12) United States Patent
Hernandez Russe et al.

(10) Patent No.: US 8,328,511 B2
(45) Date of Patent: Dec. 11, 2012

(54) PRECHORDED TURBINE NOZZLE

(75) Inventors: Wilhelm Ramon Hernandez Russe, Lynn, MA (US); John Alan Manteiga, North Andover, MA (US); Robert John Parks, Ipswich, MA (US)

(73) Assignee: General Electric Company, Schenectady, NY (US)

( * ) Notice: Subject to any disclaimer, the term of this patent is extended or adjusted under 35 U.S.C. 154(b) by 821 days.

(21) Appl. No.: 12/486,126

(22) Filed: Jun. 17, 2009

(65) Prior Publication Data
US 2010/0319352 A1    Dec. 23, 2010

(51) Int. Cl.
F01D 9/02    (2006.01)

(52) U.S. Cl. .................................... 415/209.2

(58) Field of Classification Search ............... 415/209.2, 415/209.3, 173.1
See application file for complete search history.

(56) References Cited

U.S. PATENT DOCUMENTS

| | | | |
|---|---|---|---|
| 3,860,358 A * | 1/1975 | Cavicchi et al. ........... | 415/173.1 |
| 4,759,687 A | 7/1988 | Miraucourt et al. | |
| 5,205,708 A | 4/1993 | Plemmons et al. | |
| 5,641,267 A | 6/1997 | Proctor et al. | |
| 5,655,876 A | 8/1997 | Rock et al. | |
| 5,669,757 A | 9/1997 | Brackett | |
| 5,797,723 A | 8/1998 | Frost et al. | |
| 6,183,192 B1 | 2/2001 | Tressler et al. | |
| 6,361,273 B1 * | 3/2002 | Eng et al. ................... | 415/173.1 |
| 6,702,550 B2 | 3/2004 | Darkins et al. | |
| 2006/0251519 A1 * | 11/2006 | Benedetti et al. ......... | 416/204 A |
| 2007/0031245 A1 | 2/2007 | Ruthemeyer et al. | |

FOREIGN PATENT DOCUMENTS

| | | |
|---|---|---|
| EP | 0907053 A2 | 4/1999 |
| EP | 1455053 A2 | 9/2004 |
| JP | 60030431 A | 2/1985 |
| JP | 2002242612 A * | 8/2002 |

OTHER PUBLICATIONS

GB 1009834.1, Great Britain Search Report and Written Opinion, Sep. 28, 2010.
U.S. Appl. No. 12/325,173, filed Nov. 29, 2008, Manteiga.
U.S. Appl. No. 12/325,174, filed Nov. 29, 2008, Manteiga.
U.S. Appl. No. 12/325,175, filed Nov. 29, 2008, Manteiga.

* cited by examiner

Primary Examiner — Richard Edgar
(74) Attorney, Agent, or Firm — General Electric Company; David J. Clement; William Scott Andes

(57) ABSTRACT

A turbine nozzle includes radially inner and outer bands integrally joined to opposite ends of an airfoil. The outer band has forward and aft hooks extending radially outwardly at axially opposite ends. And the hooks have different prechorded circumferential curvatures.

15 Claims, 5 Drawing Sheets

PRECHORDED TURBINE NOZZLE

The U.S. Government may have certain rights in this invention pursuant to contract number N0019-06-C-0081 awarded by the U.S. Department of the Navy.

BACKGROUND OF THE INVENTION

The present invention relates generally to gas turbine engines, and, more specifically, to turbines therein.

In a gas turbine engine, air is pressurized in a compressor and mixed with fuel in a combustor for generating hot combustion gases. Energy is extracted from the gases in turbine stages which power the compressor and a shaft that drives a fan in an aircraft turbofan engine application, or powers a gearbox in a turboshaft application.

A high pressure turbine (HPT) directly follows the combustor and receives the hottest gases therefrom from which energy is initially extracted. A low pressure turbine (LPT) follows the HPT and extracts additional energy from the gases.

Each turbine stage includes a turbine nozzle that preferentially channels the combustion gases to a corresponding row of turbine blades. The nozzle includes hollow stator vanes, and the rotor blades are similarly hollow, for channeling cooling air therethrough during operation.

Each turbine nozzle is an annular assembly of arcuate nozzle segments which must be precisely mounted in the engine coaxially with the axial centerline axis thereof.

In one configuration, the first stage LPT nozzle also includes fairing segments alternating with vane segments. Each fairing segment includes a hollow fairing through which radially extends a structural strut or service lines or conduits for internal engine components.

The nozzle segments may be accurately supported from a surrounding outer casing by corresponding supporting hooks mounted in supporting hangers. Each hook has an axially extending rail which is mounted in an axially extending groove in the support hanger.

This tongue and groove supporting arrangement facilitates assembly of the full row of nozzle segments in the engine. And, the row of nozzle segments is accurately supported and restrained both axially and radially, and coaxially about the axial centerline axis of the engine.

However, during operation the combustion gases flowing through the turbine nozzle heat the nozzle components and cause thermal expansion thereof.

The nozzle, including its airfoil vanes, is suitably cooled during operation by circulating therethrough a portion of pressurized air bled from the compressor.

The cooling air may enter the nozzle and its airfoils from the radially outer band which in turn creates a thermal gradient radially inwardly.

The surrounding support hanger is therefore cooled greater than the outer band, and the supporting hooks thermally expand differently than the thermal expansion of the supporting hangers.

Accordingly, sufficient clearance must be provided in the hanger grooves to accommodate differential thermal expansion of the hooks therein, but that clearance then creates undesirable leakage paths for the cooling air.

Insufficient clearance may cause undesirable binding or interference between the hooks and grooves. This in turn can locally increase loads and stress, and may cause misalignment or mispositioning of the nozzle segments relative to the reference axial centerline axis and adversely affect performance of the combustion gases being channeled through the nozzle to the cooperating row of turbine blades.

These problems increase the complexity of turbine nozzle design, and require suitable solutions therefor.

To reduce undesirable air leakage, auxiliary seals are typically provided at either the forward or aft nozzle hook, or both. And, tubular spoolies may be used to constrain cooling airflow into the individual nozzle airfoils.

Accordingly, it is desired to provide a turbine nozzle having improved mounting features for reducing airflow leakage.

BRIEF DESCRIPTION OF THE INVENTION

A turbine nozzle includes radially inner and outer bands integrally joined to opposite ends of an airfoil. The outer band has forward and aft hooks extending radially outwardly at axially opposite ends. And the hooks have different prechorded circumferential curvatures.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
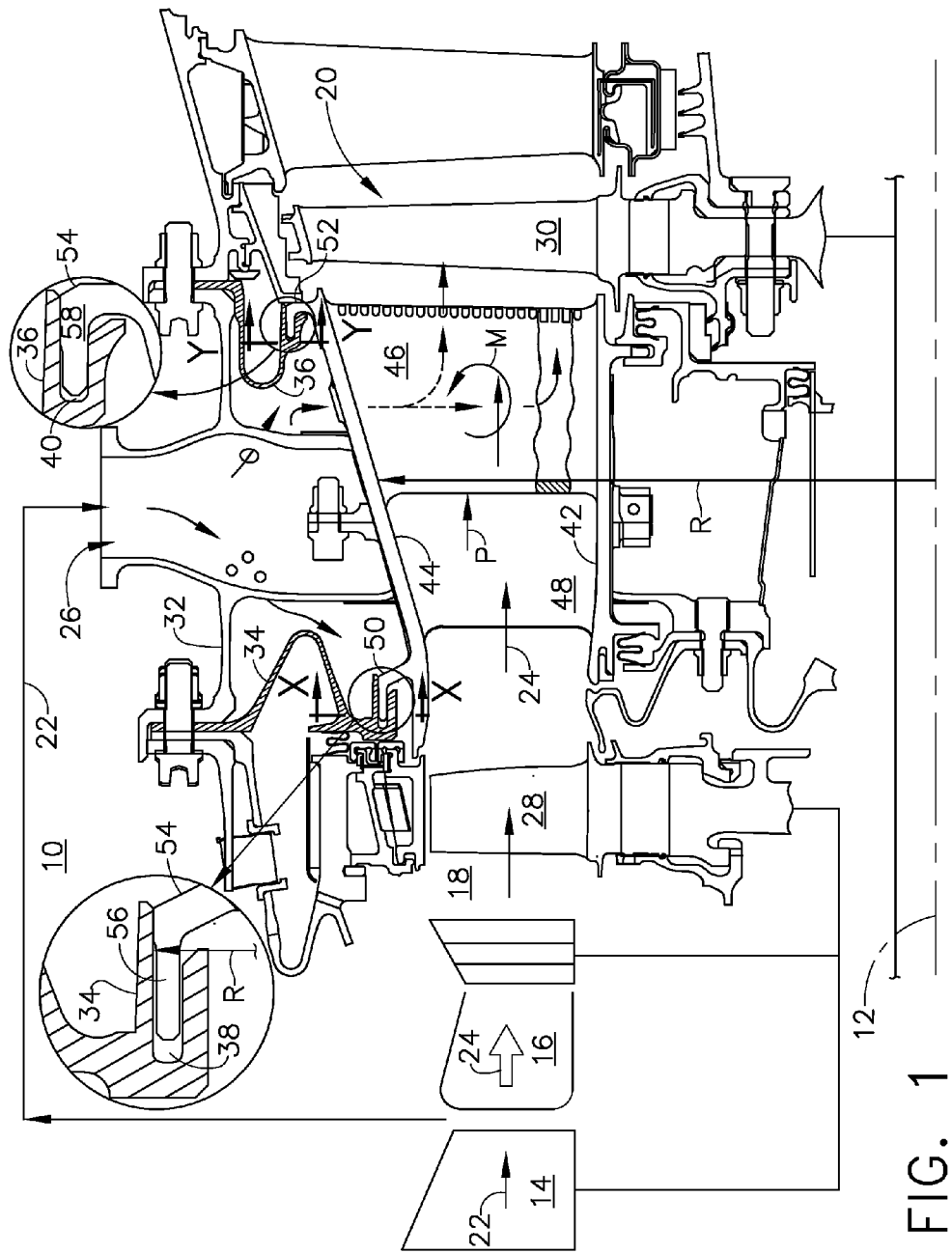
FIG. 1 is a schematic axial view of an exemplary turboshaft gas turbine engine having multiple turbine stages.

Illustrated schematically in FIG. 1 is a turboshaft gas turbine engine 10 which is axisymmetrical about a longitudinal or axial centerline axis 12.

The engine includes in serial flow communication a compressor 14, combustor 16, two-stage HPT 18, and multistage LPT 20. The rotor of the HPT 20 is joined to the rotors of the compressor 14 by one drive shaft, and the rotors of the LPT 20 are joined to the output drive shaft that powers a gearbox (not shown) for the exemplary turboshaft engine application.

During operation, air 22 is pressurized in the compressor 14 and mixed with fuel in the combustor 16 for generating hot combustion gases 24.

Energy is extracted from the combustion gases by the turbine blades of the HPT 20 to drive the compressor blades. Additional energy is extracted from the gases by the turbine blades of the LPT 20 to drive the output shaft.

The LPT 20 includes a first stage LPT nozzle 26 disposed axially between the second stage HPT rotor blades 28 and the first stage LPT rotor blades 30, which define the third turbine stage of the engine.

The nozzle 26 is supported coaxially inside a surrounding annular outer casing 32. Suitably attached or joined to the outer casing are axially spaced apart forward and aft hangers 34,36 having corresponding grooves 38,40 extending circumferentially therein.

Each hanger 38,40 is a unitary, 360 degree annular component extending radially inwardly from the casing, with the forward and aft grooves 38,40 extending axially aft in the radially inner hubs thereof.

Each groove 38,40 is defined and bounded by concentric radially inner and outer annular surfaces in each axial hub that provide a constant radial height between the outer and inner hub walls. The grooves are disposed coaxially with the engine or nozzle centerline axis 12 at a corresponding value of the radius R measured therefrom.

The nozzle 26 includes radially inner and outer arcuate bands 42,44 integrally cast or joined to opposite radial ends of a row of vanes or airfoils 46 arranged in circumferentially adjoining nozzle segments.

Figure 2:
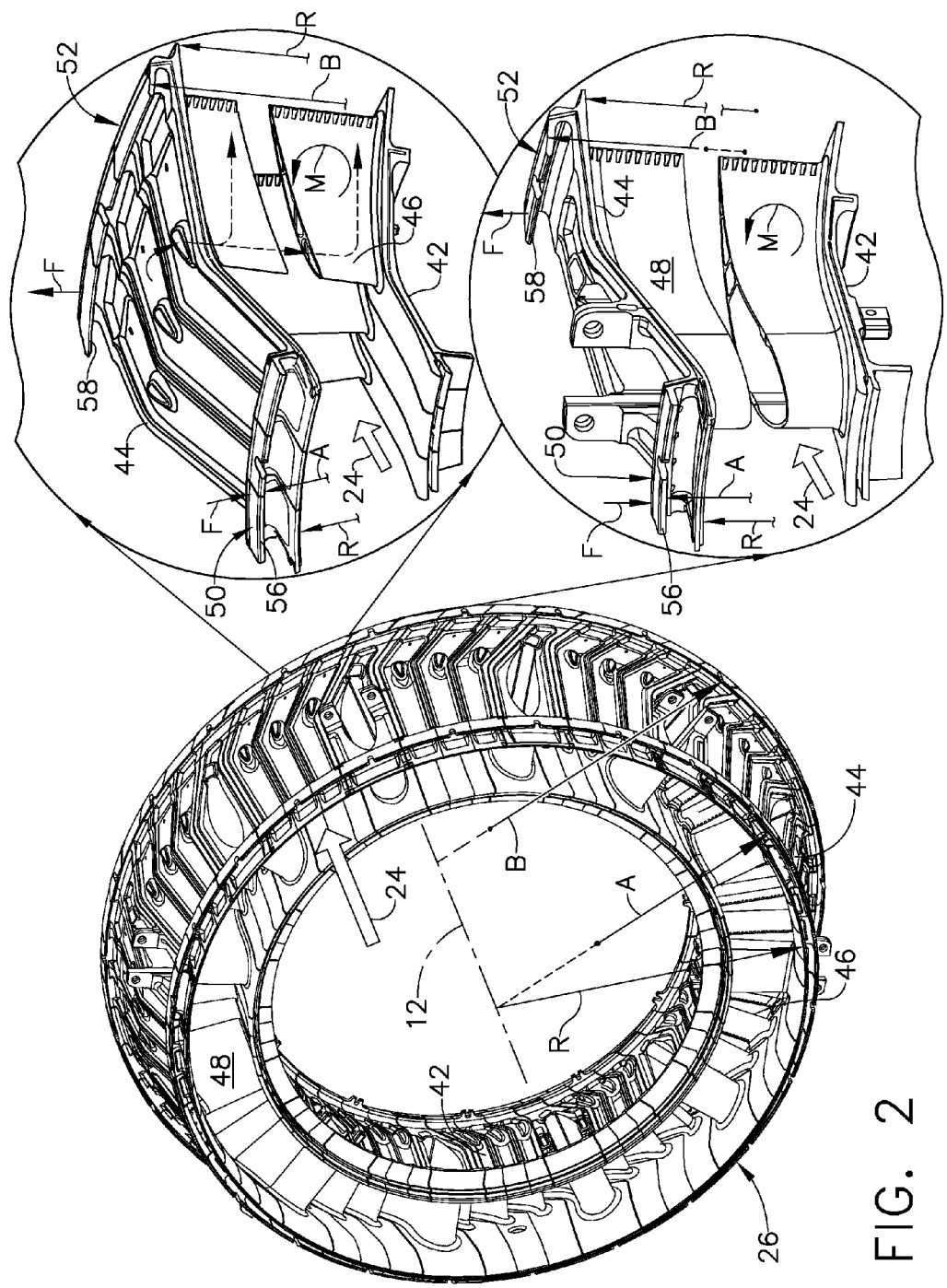
FIG. 2 is an exploded isometric view of the first stage LPT nozzle shown in FIG. 1.

For example, the segments shown in FIG. 2 include a plurality of nozzle vane triplets each having three hollow airfoil vanes 46 extending radially between corresponding inner and outer bands 42,44.

A plurality of fairing singlets alternate circumferentially with the triplets, and each singlet has a single hollow airfoil fairing 48 extending radially between corresponding inner and outer bands 42,44.

The fairing singlets are arranged in two groups of six alternating circumferentially with twelve of the nozzle triplets in the full nozzle row. Half of the fairing singlets have structural frame struts extending radially therethrough, and the remaining half of singlets have service conduits or tubes extending radially therethrough.

The hollow vanes 46 have internal cooling circuits suitably fed with pressurized air 22 bled from the compressor 14. In FIG. 1, the two hangers 34,36 axially bound the nozzle outer band 44 and define a closed annular plenum in which the pressurized air 22 is channeled, through the frame struts, for example.

The outer bands 44 of all nozzle segments have corresponding forward and aft hooks 50,52 extending radially outwardly from the outer surface of the outer band at axially opposite ends thereof.

Each of the forward and aft hooks 50,52 has an inverted L-configuration and includes a similar radial stem 54 extending radially outwardly from the outer surface of the outer band 44. The two hooks have different forward and aft circumferentially arcuate tongues or rails 56,58 extending axially from the distal outer ends of the corresponding stems 54, with a small radial down-step or recess therewith to facilitate assembly.

The forward rail 56 extends axially forwardly and is axially disposed inside the forward hanger groove 38. The aft rail 58 also extends axially forwardly and is axially disposed inside the aft hanger groove 40.

As indicated above in the Background section, suitable radial clearance must be provided between the rails and grooves for permitting assembly of the nozzle segments and preventing binding or interference during hot operation of the engine.

And particularly desirable is reducing leakage of the pressurized cooling air from the plenum between the hangers and outer band without using auxiliary seals that add structure and weight.

Accordingly, the nozzle 26 is therefore specially modified to address these competing objectives, which modification effects unique configurations of the forward and aft rails 56,58.

In a conventional turbine nozzle, the various annular or cylindrical components thereof are concentric about the axial centerline axis 12 of the engine or nozzle itself; as are those of the nozzle 26 itself, except as specifically modified hereinbelow.

Conventional hook rails are mounted concentrically in the supporting hanger grooves, and therefore require suitable radial clearance to prevent undesirable binding, interference, and corresponding loads and stress therefrom, but at the expense of cooling air leakage, which typically requires auxiliary seals, forward and aft.

Figure 3:
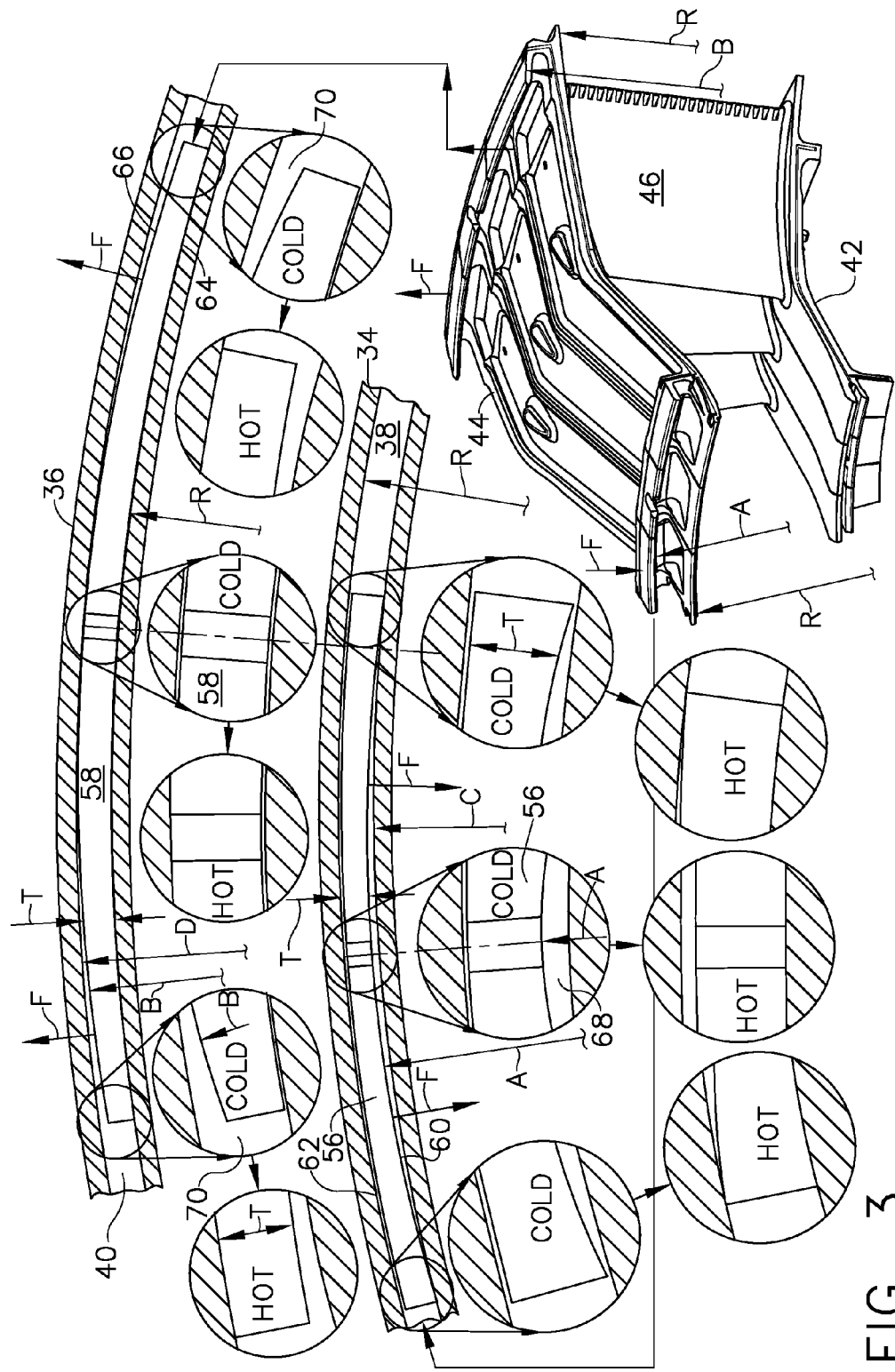
FIG. 3 is a further exploded view of an exemplary nozzle vane triplet segment from the nozzle of FIG. 2 having forward and aft outer hooks with representative radial cross-sections taken from cut lines X-X and Y-Y in FIG. 1.

In contrast, the forward and aft hooks 50,52 shown in exaggerated view in FIG. 3 are nonconcentric about the centerline axis 12, and nonconcentric with the outer band 44 circumferentially along the corresponding forward and aft rails 56,58. The two rails 56,58 are preferentially bowed radially inwardly toward the outer band 44, and have suitably different prechorded circumferential curvatures. The outer band 44 remains concentric with the inner band 42, both of which bands have correspondingly different values of the radius R as measured from the common origin represented by the axial centerline axis 12 of the nozzle.

Fundamental to the prechorded configuration of the two rails 56,58 is the recognition that radial thermal expansion of the outer band 44, which supports the two hooks 50,52, causes the circumferential profile or configuration of the two rails 56,58 to change between cold and hot conditions. And, the nozzle airfoils 46,48 are also aerodynamically loaded during operation, with pressure loads therefrom being carried radially outwardly through the two support hooks 50,52.

FIG. 1 illustrates the aft flow of the combustion gases 24 during operation which corresponding effects a net aft pressure load P on the nozzle airfoils. Since the nozzle is supported from its outer band to the outer casing, the pressure loads P effect a counterclockwise force couple or moment M.

The moment M is carried through the two hooks 50,52 with a radially outward force F through the aft hook 52, and an equal radially inward force F through the forward hook 50 as shown in FIG. 2.

Correspondingly, the two rails 56,58 shown in FIG. 3 have an initial room temperature or cold configuration when the engine is off and no combustion gases are flowing. During hot engine operation when the combustion gases flow through the nozzle, not only is the pressure moment M generated, but the nozzle components thermally expand and change size and configuration.

This change in configuration of the thermally expanded rails 56,58 may be used to advantage to improve the configuration of the nozzle, reduce air leakage, and avoid the need for auxiliary seals, in addition to other benefits.

A unique method may be used to improve the configuration of turbine nozzles, like the LPT nozzle 26, by initially mismatching circumferential curvature of the forward and aft rails 56,58 in the forward and aft grooves 38,40, respectively, in the cold condition. The forward and aft rails 56,58 are specially prechorded to effect this mismatching configuration, which prechording is originally designed into the nozzle itself.

Then the combustion gases are channeled between the inner and outer bands of the nozzle, which then thermally heat the forward and aft rails 56,58 inside their supporting grooves 38,40 during the hot condition. The hot condition may be chosen for any operating point, such as at cruise operation of the engine in an aircraft.

The forward and aft rails 56,58 then thermally expand and undergo circumferential chording inside the forward and aft grooves 36,38 under the desired hot operation condition to match circumferential curvature of the inner surface of the forward rail 56 to the inner surface of the forward groove 38, and to match circumferential curvature of the outer surface of the aft rail 58 to the outer surface of the aft groove 40.

FIG. 3 illustrates schematically the radially inward force F imparted by the forward rail 56 into the lower surface of the forward groove 38, and the change in curvature between the cold and hot conditions that effects an improved radially inner contact seal therebetween.

Corresponding, the radially outward force F is imparted by the aft rail 58 into the outer surface of the aft groove 40, and the change in curvature between the cold and hot conditions effects an improved radially outer contact seal therebetween.

These inner and outer surface seals are optimized for the hot operating condition to match concentricity of the mating surfaces along the full circumferential length or span of the two rails.

However at the cold condition, the corresponding seal surfaces are not concentric nor do they fully mate in friction contact, but instead have increased local gaps therebetween. This is acceptable for the cold condition during which the engine does not operate, with engine operation then causing the thermal expansion that improves mating and sealing of the rails in the grooves, with maximum sealing at the desired hot operating condition.

As shown in FIG. 3, the forward rail 56 has a circumferentially concave inner surface 60 and a circumferentially convex outer surface 62. The aft rail 58 correspondingly has a circumferentially concave inner surface 64 and a circumferentially convex outer surface 66.

The prechorded inner surface 60 of the forward rail and the outer surface 66 of the aft rail are nonconcentric with the outer band 44 in the cold condition so that in their thermal expanded hot condition they effect mating contact seals in their respective hanger grooves.

The different prechorded circumferential curvatures of the forward and aft rails 56,58 may be preselected by engineering analysis, testing, or design iteration to achieve the full contact outer and inner seals thereat under the hot condition.

Preferably, the inner surface of the forward rail 56 is nonconcentric in the forward groove 38 and bends or bows radially inwardly from the circumferential middle of the rail to position the circumferentially opposite ends of the forward rail closer to the outer band 44 than the middle of the rail, and thusly forms a lower middle gap 68 with the inner surface of the forward groove 38 in the cold condition.

The forward rail 56 is circumferentially symmetric as shown and therefore the middle gap has maximum radial height at the circumferential center of the forward rail 56, and decreases in height to the opposite ends of the rail. The forward rail could be nonsymmetric, and the maximum gap height may be otherwise located for providing the desired contact seal.

Correspondingly, the outer surface of the aft rail 58 is nonconcentric in the aft groove 40 and bends or bows radially inwardly from the circumferential middle of the rail to position the circumferentially opposite ends of the aft rail 58 closer to the outer band 44 than the middle of the rail. This forms two upper end gaps 70 with the outer surface of the aft groove 40 at the opposite circumferential ends of the aft rail 58 during the cold condition.

The aft rail 58 is also circumferentially symmetric as shown, although in alternate embodiments it may be nonsymmetric for providing the desired contact seal.

The radial thickness T of the two rails 56,58 may be selected as desired to otherwise minimize the radial clearance with the two grooves 38,40, and thereby minimize air leakage, but without effecting undesirable binding or interference fit of the rails in the grooves.

In FIG. 3, the outer surface of the forward rail 56 is concentric with the outer surface of the forward groove 38 in the cold condition. And, the inner surface of the aft rail 58 is concentric with the inner surface of the aft groove 40 in the cold condition.

In the hot condition, the profiles of the forward and aft rails 56,58 undergo chording, or change in curvature along their chordal span, to invert the cold profiles and move the lower middle gap under the forward rail 56 to the upper middle, whereas the two upper end gaps above the aft rail 58 are moved under the lower ends.

The lower surface of the forward rail 56 then chords concentrically with the lower surface of the forward groove 38, and the upper surface of the aft rail 58 chords concentrically with the upper surface of the aft groove 40 at the hot condition to effect the desired contact mating seals therebetween.

FIG. 3 illustrates one embodiment in which the forward and aft rails 56,58 vary in radial thickness T circumferentially therealong in the initial cold condition. However, the radial thickness T of the rails 56,58 is substantially constant axially forward from the down-step junction with the radial stem 54.

The radial thickness T of the two rails 56,58 varies differently due to the different inner and outer mating seals formed thereat to minimize the radial clearance with the two grooves 38,40.

In particular, the forward rail 56 is thinner at its circumferential middle than at its circumferentially opposite ends. The radial thickness T of the forward rail decreases inboard from its two circumferentially opposite ends, with minimum thickness at the middle and correspondingly maximum lower radial clearance, and maximum thickness at the two ends and correspondingly minimum radial clearance.

The concave inner surface 60 of the forward rail 56 has circumferential curvature defined by the local radius of curvature A which does not share the same origin as the centerline axis 12 and the radii R measured therefrom. That inner surface has less curvature A than the corresponding curvature R of the opposite convex outer surface of the forward rail 56.

Since the forward rail 56 is not concentric with the outer band 44, the smaller curvature of the inner surface thereof is an arcuate portion of a circle of curvature of local radius A, whose origin will lie on the radius R from the centerline axis 12 for the circumferentially symmetric embodiment, but falls short of that centerline origin.

Correspondingly, the different aft rail 58 is thicker at its circumferential middle than at its circumferentially opposite ends to provide small radial clearance in the groove 40 at the middle, and larger, upper end clearances at the opposite ends.

The convex outer surface 62 of the aft rail 58 correspondingly has circumferential curvature defined by the local radius of curvature B which does not share the same origin as the centerline axis 12 and the radii R measured therefrom. That outer surface has less curvature B than the corresponding curvature R of the opposite concave inner surface of the aft rail 58.

Since the aft rail 58 is not concentric with the outer band 44, the smaller curvature of the outer surface thereof is an arcuate portion of a circle of curvature of local radius B, whose origin may lie on the radius R from the centerline axis 12, but again falls short of that centerline origin.

The forward and aft grooves 38,40 are themselves concentric with the outer band 44, and have corresponding values of radii R measured from the common centerline axis 12.

In particular, the inner surface of the forward groove 38 has a radius of curvature C, whereas the outer surface of the aft groove 40 has a larger radius of curvature D, both measured from the common centerline axis 12.

The curvature A of the concave inner surface of the forward rail 56 is suitably less than the curvature C of the mating convex inner surface of the forward groove 38 due to the cold prechording.

And, the curvature B of the convex outer surface of the aft rail 58 is suitably less than the curvature D of the concave mating outer surface of the aft groove 40 due to the cold prechording.

Furthermore, the concave inner surface 60 of the forward rail 56 has less curvature A than curvature B of the convex outer surface 66 of the aft rail 58 located both axially aft therefrom, and at a larger radius R.

Figure 4:
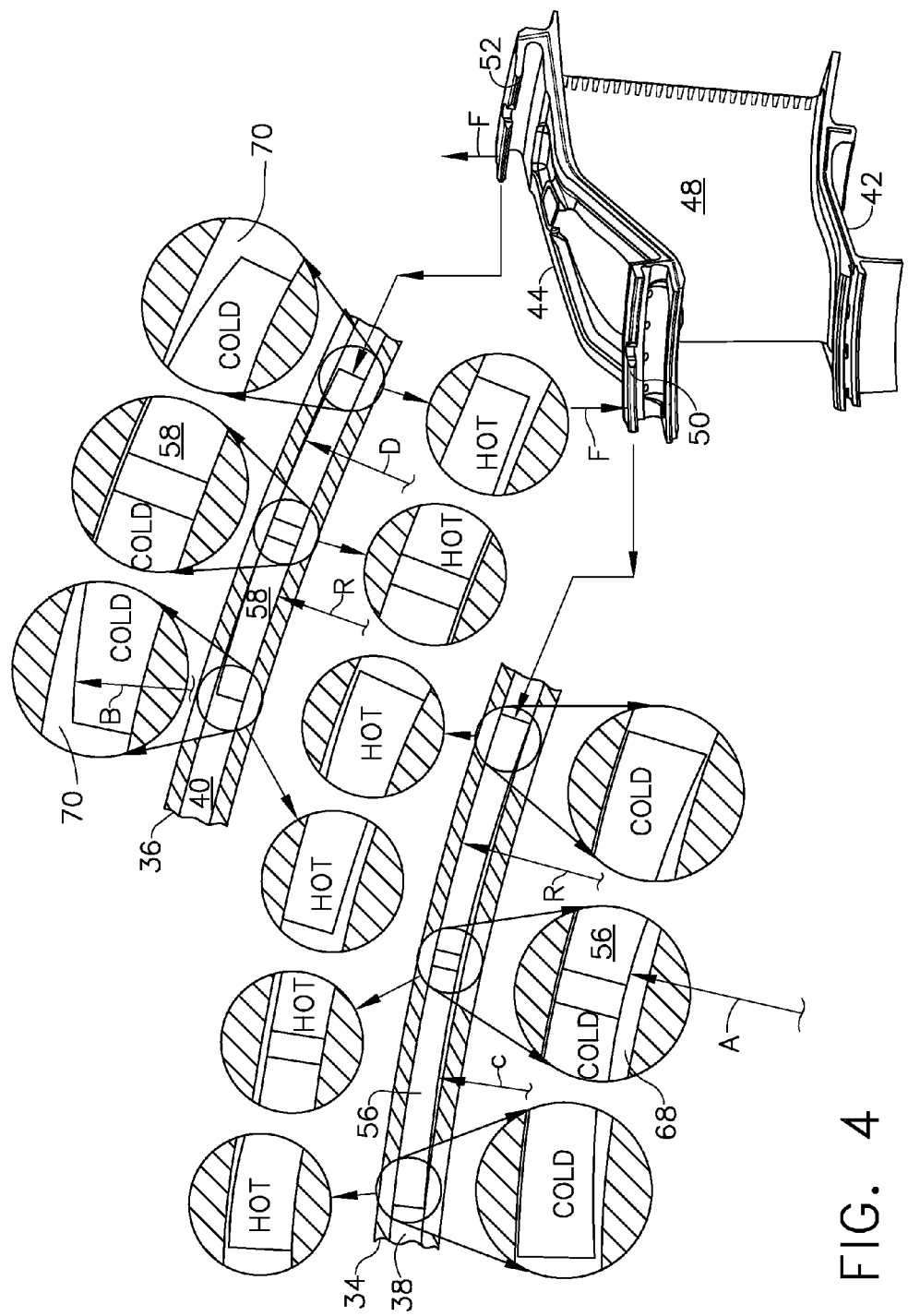
FIG. 4 is a further exploded view of an exemplary nozzle fairing singlet segment from the nozzle of FIG. 2 having forward and aft outer hooks with representative radial cross-sections taken from cut lines X-X and Y-Y in FIG. 1.

FIG. 4 illustrates an exemplary fairing singlet, which like the vane triplet of FIG. 3, has the fairing airfoil 48 mounted between the two bands 42,44, with corresponding forward and aft hooks 50,52 having forward and aft rails 56,58 mounted in the corresponding forward and aft hanger grooves 38,40.

The single fairing 48 is axially longer than the vanes 46, as best shown in FIG. 1, and the bands 42,44 are circumferentially shorter in length or span in FIG. 4 than the bands supporting the triple vanes 46 in FIG. 3.

Otherwise, the triplets and singlets are substantially identical in configuration, with the rails 56,58 being similarly prechorded in curvature A,B in the cold condition for matching the concentric curvatures C,D of the respective inner surface of the forward groove 38 and outer surface of the aft groove 40 during the hot condition for effecting mating contact seals therewith.

Since the forward and aft rails 56,58 of the triplets and singlets have different circumferential span, they also have different circumferential curvatures A,B.

The curvature A in the triplets is slightly larger than the curvature A in the singlets; and similarly, the curvature B in the triplets is also slightly larger than the curvature B in the singlets.

And since the outer bands 44 increase in radius R downstream between the two hooks 50,52, the curvature B of the aft rail 58 is larger than the curvature A of the forward rail 56 for both the triplets and singlets.

Common to the nozzle 26 are the two hooks 50,52 that engage the corresponding support grooves 38,40 in a specific configuration including the various circumferential curvatures A,B,C,D. Those curvatures are preselected to effect suitable cold prechording of the forward and aft rails 56,58 so that thermal expansion effects hot chording in the rails to match curvature with the corresponding groove seats and create the desired full contact mating seals.

Accordingly, those curvatures A,B,C,D may vary as required in different configurations of the nozzle having different geometry and dimensions for effecting the desired contact seals between the rails and grooves at the axially opposite ends of the outer bands of the various vane and fairing nozzle segments. Suitable cold prechording of the rails may be determined for each nozzle configuration to offset the expected hot chording of the rails and effect the corresponding contact seals having concentric mating surfaces.

Figure 5:
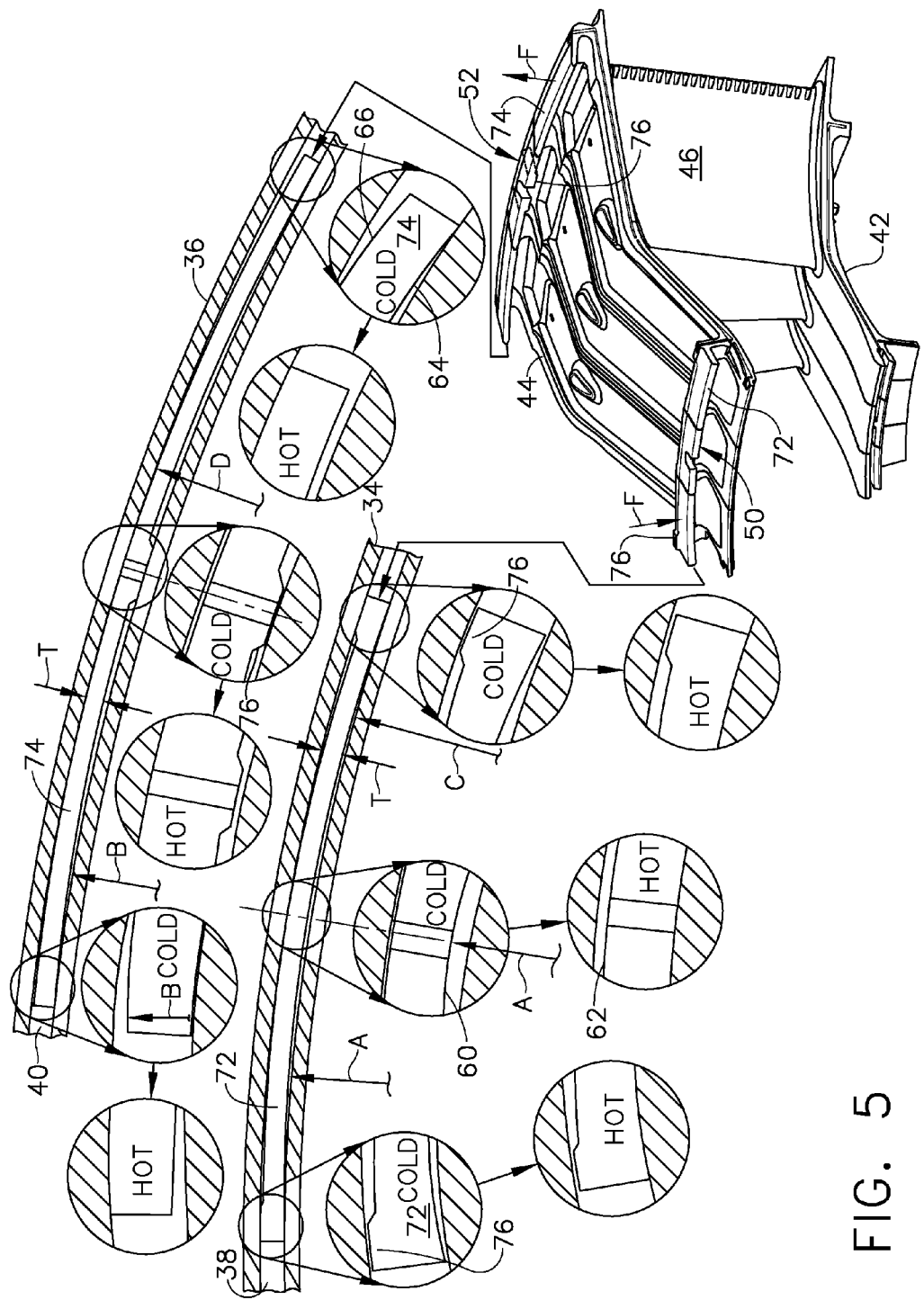
FIG. 5 is a view like FIG. 3 of the vane triplet in accordance with another embodiment.

FIG. 5 illustrates another embodiment substantially like that of FIG. 3 which is otherwise identical except for a different configuration of the forward and aft rails, designated 72,74, in the corresponding forward and aft hooks 50,52.

Likewise, the new rails 72,74 for the vane triplet shown in FIG. 5 apply identically for the fairing singlet of FIG. 4, except for the shorter circumferential span thereof.

In this alternate embodiment, the forward and aft rails 72,74 have substantially constant radial thickness T along the circumferential length or span thereof, except at an integral local pad 76. And, the radial thickness T of the rails 72,74 is also substantially constant axially forward from the downstep junction with the radial stem 54.

The aft rail 74 includes a single pad 76 at the circumferential middle of the radially inner surface thereof, and is locally thicker thereat than at its circumferentially opposite ends. The aft rail 74 has constant thickness circumferentially from the middle pad 76 circumferentially outwardly to both opposite ends.

The aft rail 74 includes a circumferentially convex outer surface 66, and a circumferentially concave inner surface 64 which bend or bow together radially inwardly from the middle pad 76 disposed thereon.

Correspondingly, the forward rail 72 includes a pair of the pads 76 along the outer surface at the circumferentially opposite ends. These two end pads 76 are localized at the junction of the rail 72 and its supporting stem 54, with the rail 72 being radially thinner circumferentially between the pads. And, the concave inner surface 60 of the forward rail 72 has less curvature A than the convex outer surface 62 thereof.

FIGS. 3-5 illustrate two alternate embodiments with either variable or constant thickness of the rails along the circumferential span which may be manufactured by suitable machining as desired. In both embodiments, three distinct point supports between the two rails 56,58 preferentially position the segments in the supporting grooves and minimize segment rocking due to provided clearances.

In FIG. 5, the three pads 76 define the three support points. In FIGS. 3 and 4, the upper ends of the forward rail 56 and the lower middle of the aft rail 58 define the three support points.

Small radial clearances are still required between the rails and grooves, but the prechorded rails substantially reduce airflow leakage under the hot operating condition to increase turbine efficiency.

Undesirable interference and binding between the rails and grooves may be minimized or prevented, and therefore corresponding loads and stress therefrom may be also be minimized.

Furthermore, the improved contact sealing between the rails and grooves under the hot condition eliminates the need for auxiliary sealing mechanisms like W-seals, leaf seals, or bolted flanges.

Yet further, the nozzle hooks 50,52 can be substantially shorter in radial height than they would otherwise be due to the elimination of the auxiliary seals, which in turn further reduces thermal stress in the nozzle.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

The invention claimed is:
1. A turbine nozzle comprising:
radially inner and outer bands joined to opposite ends of an airfoil;

said outer band including forward and aft hooks extending radially outwardly therefrom at axially opposite ends, with each hook having a corresponding axially extending rail;

said forward rail including a circumferentially concave inner surface, and said aft rail including a circumferentially convex outer surface; and said forward and aft rails have different prechorded circumferential curvatures;

said inner surface of said forward rail is defined by an arcuate portion of a first circle of curvature having a first local radius and said inner surface bows radially inwardly from the circumferential middle thereof to position circumferentially opposite ends closer to said outer band than said middle thereof;

said outer surface of said aft rail is defined by an arcuate portion of a second circle of curvature having a second local radius different from the first local radius, and said inner surface bows radially inwardly from the circumferential middle thereof to position circumferentially opposite ends closer to said outer band than said middle thereof; and wherein said inner surface of said forward rail and said outer surface of said aft rail are nonconcentric with said outer band.

2. A nozzle according to claim 1 wherein said forward and aft rails vary in radial thickness circumferentially therealong.

3. A nozzle according to claim 2 wherein said aft rail is thicker at its circumferential middle than at its circumferentially opposite ends.

4. A nozzle according to claim 3 wherein said forward rail is thinner at its circumferential middle than at its circumferentially opposite ends.

5. A nozzle according to claim 1 wherein said forward and aft rails have substantially constant thickness circumferentially therealong except at an integral local pad.

6. A nozzle according to claim 5 wherein said aft rail includes a circumferentially concave inner surface having said pad at the circumferential middle thereof, and is thicker thereat than at its circumferentially opposite ends.

7. A nozzle according to claim 6 wherein said forward rail includes a circumferentially convex outer surface having a pair of said pads at circumferentially opposite ends, and is thinner circumferentially between said pads.

8. A nozzle according to claim 1 wherein said aft rail includes a circumferentially convex outer surface having less curvature than a circumferentially concave inner surface thereof.

9. A nozzle according to claim 1 wherein said forward rail includes a circumferentially concave inner surface having less curvature than a circumferentially convex outer surface thereof.

10. A nozzle according to claim 1 further comprising:
forward and aft hangers having corresponding grooves extending circumferentially therein;
said forward rail being axially disposed in said forward groove, and
said aft rail being axially disposed in said aft groove; and said forward and aft rails are nonconcentric with said forward and aft grooves, respectively, and with said outer band.

11. A nozzle according to claim 10 wherein:
said forward rail has a circumferentially concave inner surface having less curvature than a circumferentially convex inner surface of said forward groove; and
said aft rail has a circumferentially convex outer surface having less curvature than a circumferentially concave outer surface of said aft groove.

12. A nozzle according to claim 11 wherein:
said aft rail is thicker at its circumferential middle than at its circumferentially opposite ends; and
said forward rail is thinner at its circumferential middle than at its circumferentially opposite ends.

13. A nozzle according to claim 11 wherein:
said forward rail includes a pair of integral local pads at circumferentially opposite ends, and is thinner circumferentially between said pads; and
said aft rail includes a single pad at the circumferential middle thereof, and is thicker thereat than at its circumferentially opposite ends.

14. A method of using said turbine nozzle according to claim 10 comprising:
initially mismatching circumferential curvature of said forward and aft rails in said forward and aft grooves, respectively;
channeling combustion gases between said inner and outer bands to thermally heat said forward and aft rails; and
thermally expanding said forward and aft rails inside said forward and aft grooves to match circumferential curvature of the inner surface of said forward rail to the inner surface of said forward groove, and the outer surface of said aft rail to the outer surface of said aft groove.

15. A nozzle according to claim 10 further comprising:
a plurality of nozzle vane triplets each having three vane airfoils extending radially between corresponding inner and outer bands;
a plurality of fairing singlets alternating circumferentially with said triplets, and each singlet having a single fairing airfoil extending radially between corresponding inner and outer bands; and
said forward and aft rails of said triplets and singlets have different circumferential curvature, respectively.

* * * * *